Feb. 25, 1930.  R. A. LINCOLN  1,748,357
PIPE CUTTER
Filed May 31, 1928
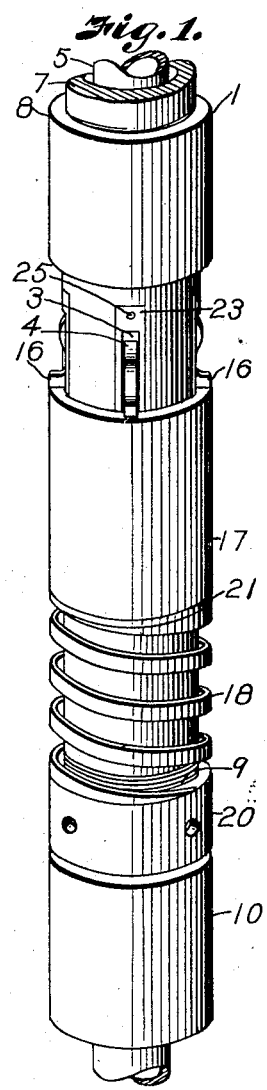
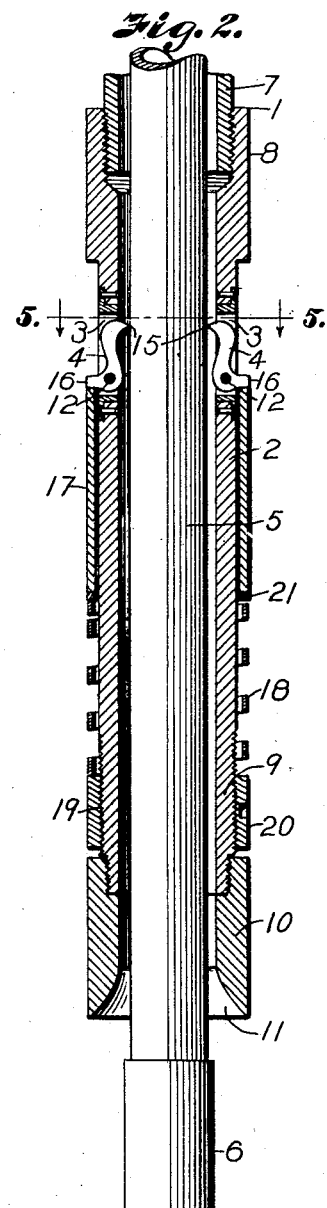
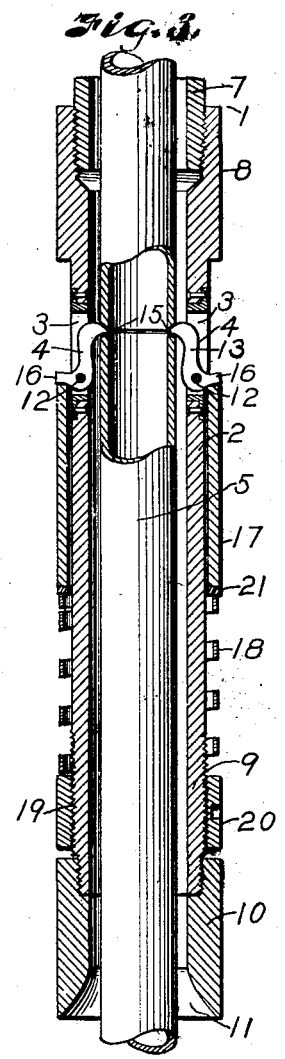
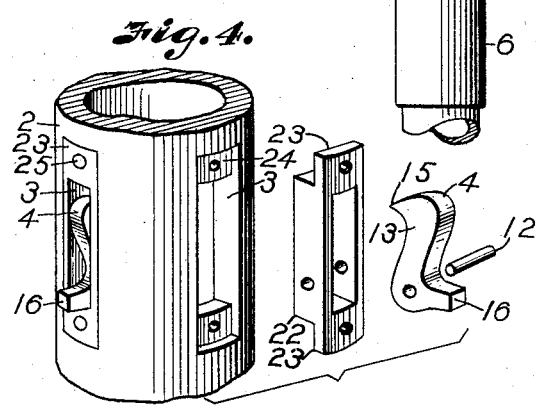
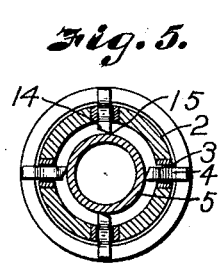
INVENTOR.
Robert A. Lincoln
BY Arthur G. Brown
ATTORNEY.

Patented Feb. 25, 1930

1,748,357

UNITED STATES PATENT OFFICE

ROBERT A. LINCOLN, OF WICHITA FALLS, TEXAS, ASSIGNOR OF ONE-HALF TO AMERICAN IRON & MACHINE WORKS, INC., OF OKLAHOMA CITY, OKLAHOMA, A CORPORATION OF OKLAHOMA

PIPE CUTTER

Application filed May 31, 1928. Serial No. 282,012.

My invention relates to pipe cutters, and more particularly to rotatable cutters for cutting objects such as pipes and rods at a position relatively remote from the cutter-actuating means, for example, in cutting tubing in a well, the principal objects of the invention being to apply the cutter to a selected portion of a pipe, and to insure the functioning of cutting members. Further objects are to facilitate the movement of the device over a string of pipe toward cutting position, to resiliently urge the cutting member into functioning engagement with the pipe, and to adjust the tension of resilient urging means.

In accomplishing these and other objects of the invention I have provided improved details of structure, the preferred forms of which are illustrated in the accompanying drawings, wherein:

Fig. 1 is a perspective view of the device mounted on a pipe, the pipe and a supporting member being shown fragmentarily.

Fig. 2 is a vertical central sectional view, illustrating the relation of the device to a pipe and pipe coupling, and showing the edges of the cutting members in engagement with the periphery of the pipe.

Fig. 3 is a similar vertical central sectional view illustrating the position of parts after the pipe has been cut.

Fig. 4 is an enlarged detail perspective view of the cutter-supporting portion of the body of the device, and showing a cutter cage, cutter, and pivot pin separated from the body.

Fig. 5 is a cross section on the line 5—5, Fig. 2.

Referring in detail to the drawings:

1 designates a cutter support comprising preferably a tubular body 2 having a slot 3 wherein a cutter 4 is movable into cutting engagement with a pipe 5 on which the body is mounted for cutting the pipe. The device is illustrated as applied to a section of tubing as in an oil well, and the body 2 is of suitable diameter for free movement over the tubing and for passing pipe couplings, such as 6, so that the device may be passed over a plurality of pipe sections for positioning in cutting relation with the pipe section that is to be cut.

A tubular member 7 is screw-threadedly engaged with the upper enlarged end 8 of the body for advancing the body towards cutting position and for rotating the body to effect the cutting operation, the member 7 supporting the body and extending upwardly to actuating means (not shown) at the top of the well.

The lower end 9 of the body is reduced and externally screw-threaded to support a guide member 10 having a flaring mouth 11 for facilitating the advancing movement of the device over the couplings of a string of pipe sections, and through fluid in the well.

A plurality of similar cutters 4 may be provided, and one will be particularly described.

The cutter 4 is pivotally supported on a pin 12 extending across the slot 3 transversely of the body 2, and has an arcuate cutting arm 13 provided with a cutting edge 14 which is beveled to produce a cutting point 15, adapted to move circumferentially over the pipe upon rotation of the body. Extending from the cutter oppositely to the arm 13 is a heel or lever arm 16, which projects radially beyond the periphery of the body, and a sleeve 17 slidable on the body is urged against the heel 16 by a spring 18 to pivot the cutter and hold the point 15 in contact with the pipe. Screw-threadedly engaged with a threaded portion 19 of the body adjacent the reduced end 9 is a retaining and adjusting nut 20 against which the spring bears, the nut being rotatable to increase or reduce the tension of the spring, and thereby vary the relation of the cutter to the pipe. A washer 21 may be interposed between the spring and the sleeve.

I preferably support the cutter 4 from the body by a cage or socket member 22 fitting in the slot 3, and having end flanges 23 seatable in recesses 24 adjacent the slot, the cage being secured to the body of the device by rivets 25 extending in suitable openings of the body and flanges, and having heads countersunk in the respective members. The cutter is mounted in the cage and the cage fixed in the slot, for assembling the device.

A cutting device constructed as described, may be provided of suitable diameter for operating on the pipe to be cut, and the adjusting nut moved to provide the suitable tension on the spring for pivoting the cutters into effective cutting relation with the pipe and for assuming the penetration of the pipe by the cutters.

The device is advanced over the pipe, for example, being lowered over a string of pipe sections joined by couplings, by the tubular supporting member, the guide member guiding the body member over the couplings, and the cutters being pivotally retracted against the influence of the spring. When the cutters have been advanced to cutting location, the tubular supporting member is rotated by suitable means, and the cutters cut a circumferential groove in the pipe, the groove deepening upon each successive rotation of the device until the parts of the pipe are separated.

What I claim and desire to secure by Letters Patent is:

1. A tool of the character described, including a tubular body having a slot, a cutting member movably mounted in said slot having a cutting point and a heel projected inwardly and outwardly of said body respectively, an actuator on said body engaging said heel, and means yieldingly urging the actuator against said heel to project the cutting point to cutting position.

2. A tool of the character described, including a tubular body having a slot, a cutting member movably mounted in said slot having a cutting point and a heel projected inwardly and outwardly of said body respectively, a sleeve slidable on said body, and means yieldingly urging the sleeve against said heel to project the cutting point inwardly of said body.

3. A tool of the character described, including a tubular body having a slot, a cutting member eccentrically pivoted in said slot having a cutting point at its inner end and a heel at its outer end projecting from said body, a sleeve slidable on said body and engaging said heel, and a spring urging the sleeve to rock the cutting member.

4. A tool of the character described, including a tubular body having spaced annular protuberances and a slot between the protuberances, a cutting member eccentrically pivoted in said slot having a cutting point at one end projected inwardly of said body and a heel at its other end projected into the space between said protuberances, a sleeve slidable on said body, and a spring surrounding the body and engaging said sleeve at one end and one of said protuberances at its opposite end to rock the cutting member to cutting position.

5. A tool of the character described, including a tubular body having spaced annular protuberances and a slot between the protuberances, a cutting member eccentrically pivoted in said slot having a cutting point at one end projected inwardly of said body and a heel at its other end projected into the space between said protuberances, a sleeve slidable on said body beneath the slot, a spring surrounding said body engaging the lower of said protuberances at one end and said heel at its opposite end to rock the cutting member.

In testimony whereof I affix my signature.

ROBERT A. LINCOLN.